Dec. 29, 1959     C. C. BAUERLEIN ET AL     2,918,803
AUTOMATIC ICEMAKER
Filed June 24, 1957     4 Sheets-Sheet 4
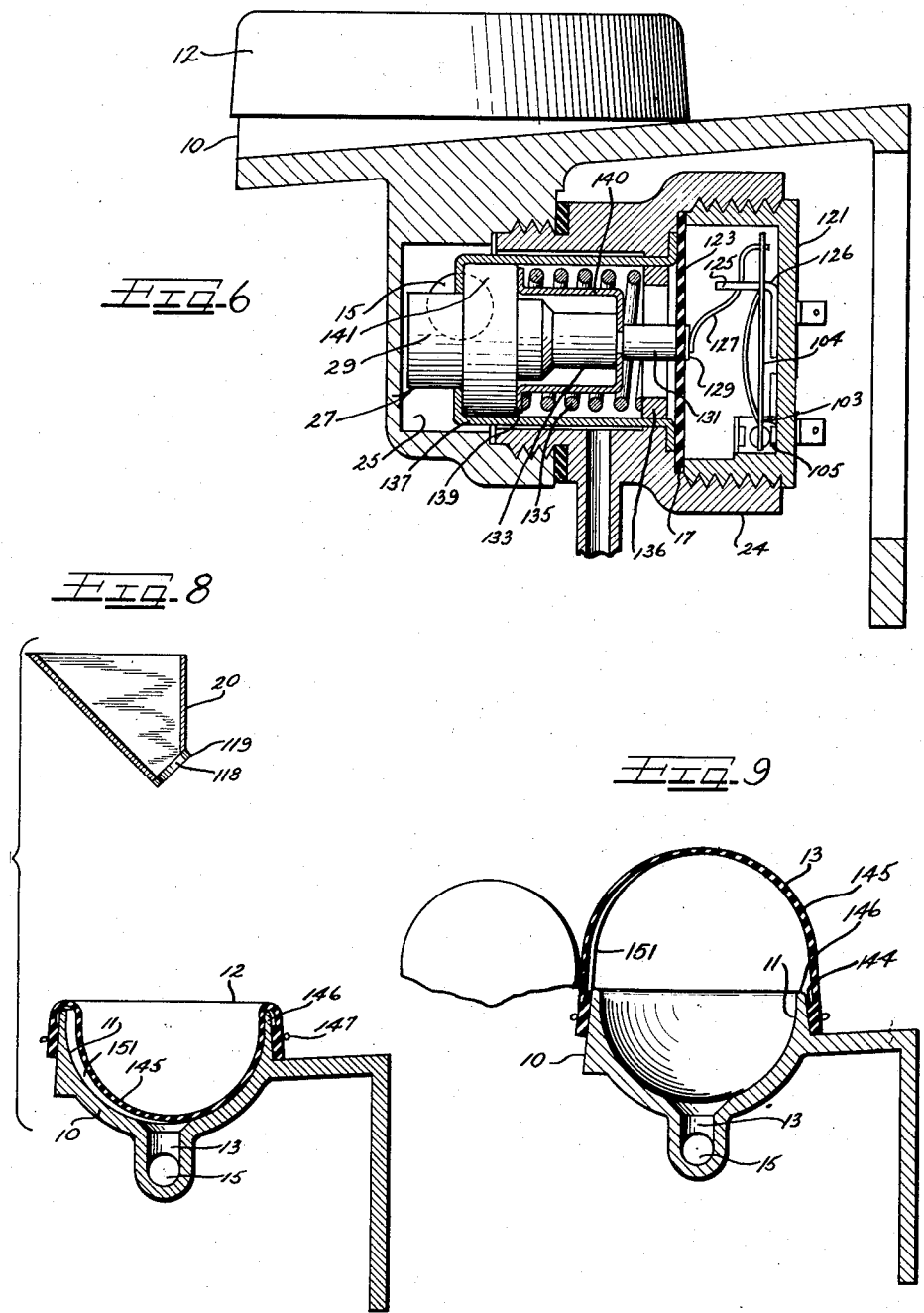
Inventors
CARL C. BAUERLEIN
MULLAPUDI M. REDDI United States Patent Office 2,918,803
Patented Dec. 29, 1959

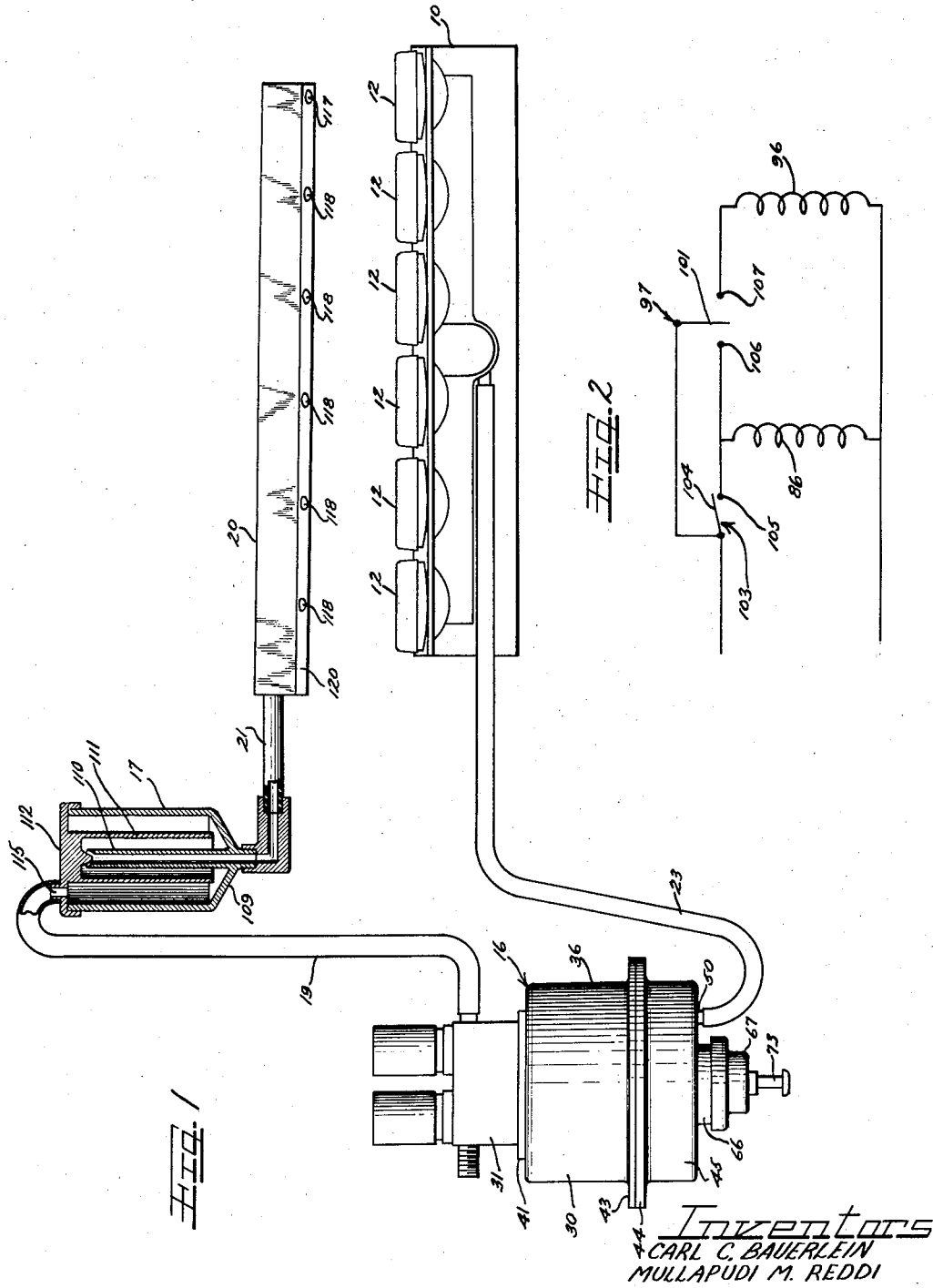

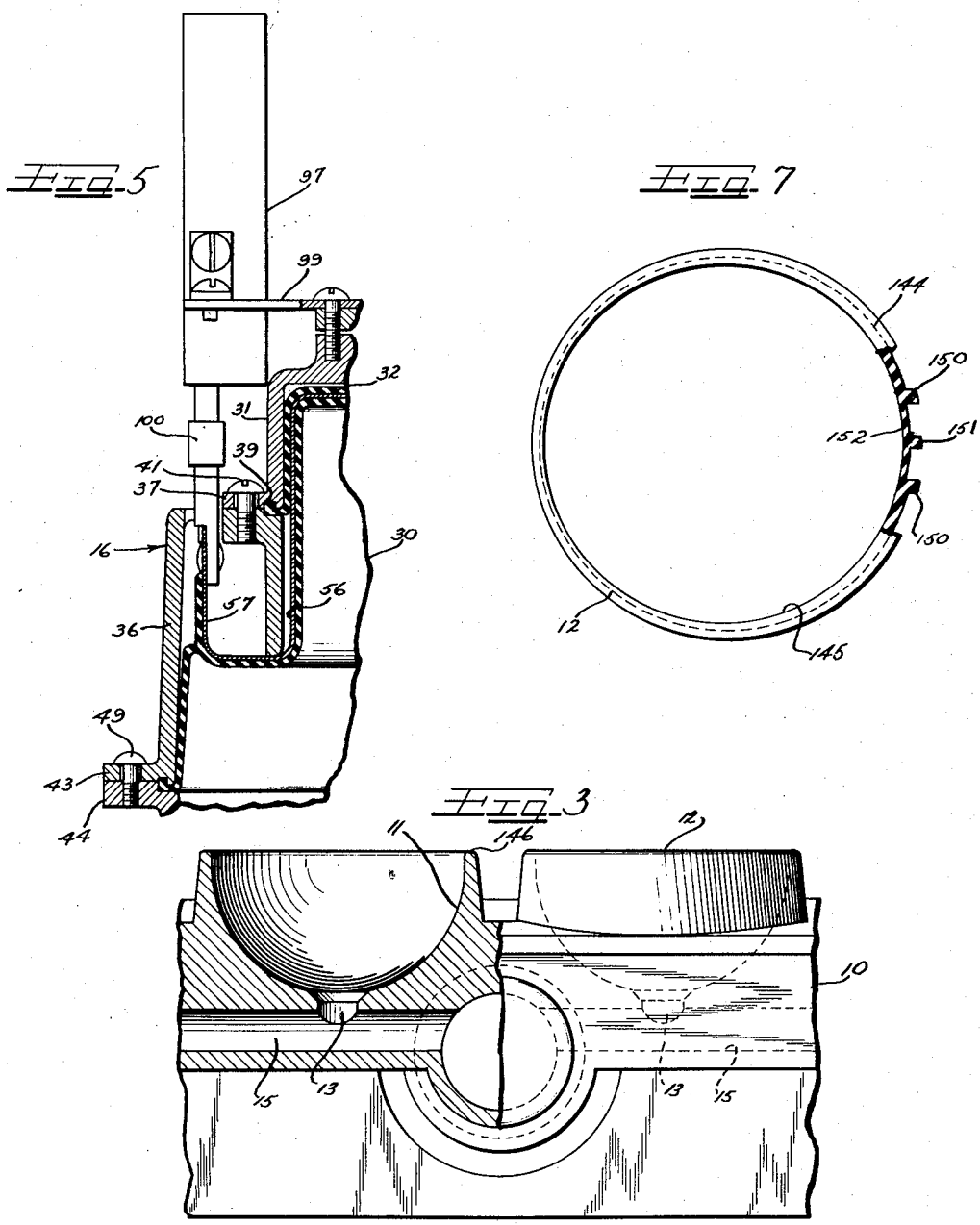

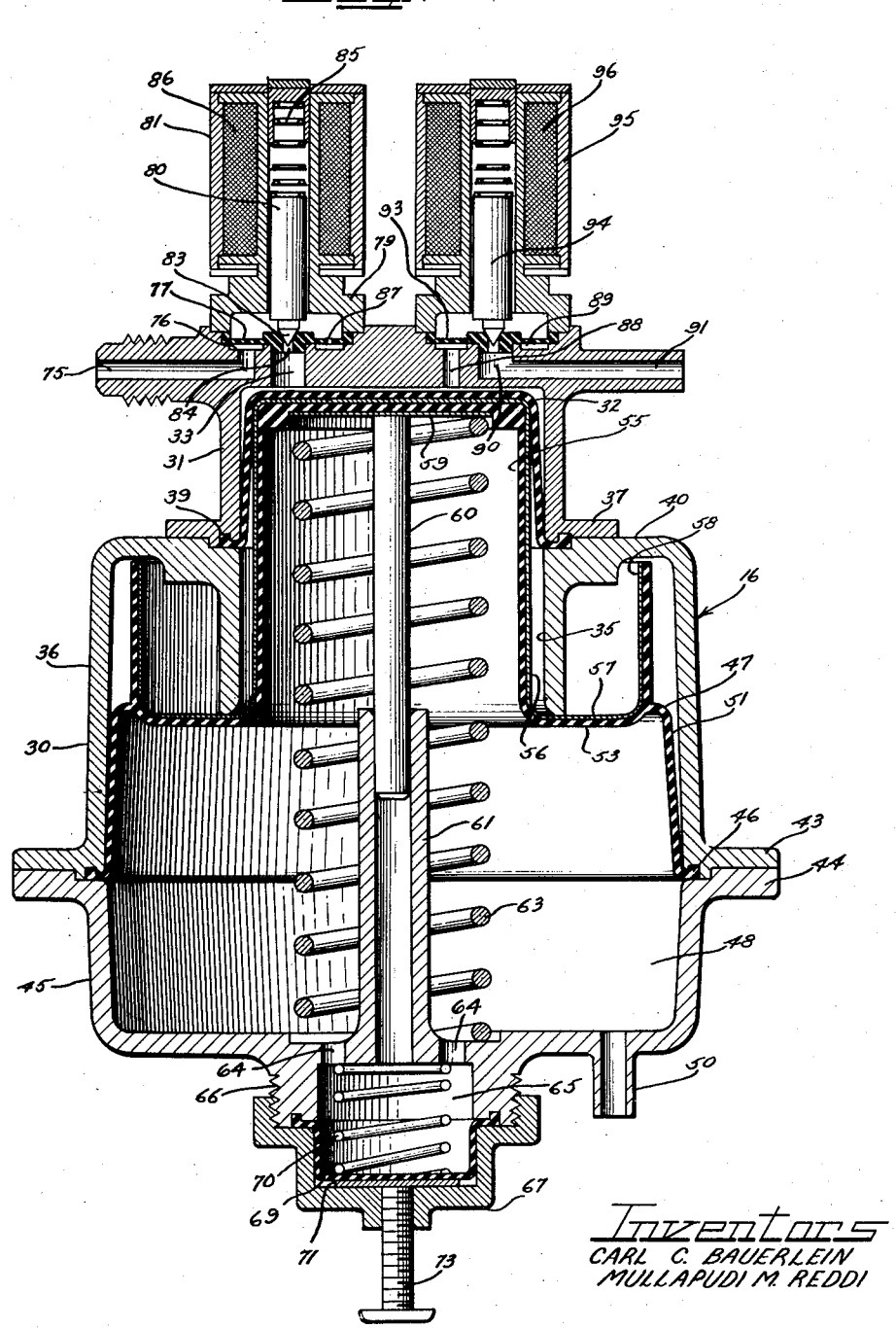

2,918,803

AUTOMATIC ICEMAKER

Carl C. Bauerlein, Lincolnwood, and Mullapudi M. Reddi, Chicago, Ill., assignors to The Dole Valve Company, Morton Grove, Ill., a corporation of Illinois Application June 24, 1957, Serial No. 667,541

20 Claims. (Cl. 62—135)

This invention relates to improvements in automatic icemakers and more particularly relates to icemakers adapted for use in household refrigerators.

A principal object of the invention is to provide a novel and improved form of icemaker arranged with a view toward utmost simplicity and efficiency in construction and operation.

A further object of the invention is to provide a simplified form of automatic icemaker of the type in which water is frozen in flexible molds and the frozen water is ejected from the molds by inverting the molds by the applying of fluid under pressure to the undersides thereof, and in which the molds are so constructed and arranged as to free ice therefrom and discharge the ice to one side thereof at the termination of each ejecting operation.

A still further object of the invention is to provide an automatic icemaker in which water is frozen in flexible molds, in which a metering device is provided to fill the molds with a measured volume of water, and in which the pressure of the water filling the metering device supplies the pressure to invert the molds and eject the frozen water therefrom.

A still further object of the invention is to provide a simplified form of automatic icemaker to be contained within a household refrigerator of the type in which water is frozen in the form of ice cubes in invertible flexible molds, inverted to eject the ice cubes therefrom, in which the freezing and ejecting cycles are controlled by a thermal element in heat transfer relation with respect to the freezing water, and in which the ice cubes are ejected by fluid under pressure stored in a region of a substantially higher ambient temperature than the temperature within the refrigerator, and supplying the heat to reset the thermal element to effect a next succeeding filling operation of the molds at the termination of each ejecting operation.

A still further object of the invention is to provide an automatic icemaker of the type in which water is frozen in flexible molds, inverted to eject the frozen water therefrom by fluid under pressure, in which a fluid metering device is provided to fill the molds with water and a thermal element in heat transfer relation with respect to the ice cubes is provided to effect the supply of fluid under pressure to eject the ice cubes from their molds when frozen, in which the pressure of filling the metering device supplies the pressure to effect the ejecting operation and in which a time delay is provided in the filling connection from the metering device to the molds to delay the filling of the molds until the molds have returned from their inverted ejecting positions to their normal positions in the ice cube tray therefor.

A still further object of the invention is to provide a novel and improved form of flexible mold for icemakers in which the mold is so formed as to assure the ejection of the ice cubes to one side of the mold and to prevent the sticking of ice cubes thereto at the termination of the operation of ejecting ice cubes from the mold.

Another object of the invention is to provide a flexible mold for ice cubes and the like in which the mold is inverted to effect the ejection of an ice cube therefrom and is stiffer on one side than on the other to effect the peeling of the ice cube from the more resilient side of the mold and the adhering of the cube to the stiffer side as the mold is inverted, and which stretches on the stiffer side of the mold upon complete inversion of the mold to release the ice cube therefrom.

A still further object of the invention is to provide novel and improved form of ice cube mold of a type which is inverted to effect the ejection of an ice cube therefrom, which mold has stiffening means extending along one side thereof, stiffening this side of the mold and causing the ice cube to peel from the opposite side of the mold and adhere to the stiffer side of the mold during the ice cube ejecting operation, to effect the ejection of ice cubes to the same side of the mold during each ejecting operation, and in which the wall section of the mold along the stiffening means is thinner than the wall section of the balance of the mold to accommodate stretching of the thinner section by the force of the ejector fluid acting thereon at the termination of the ejecting operation, to positively release an ice cube from the mold.

These, and other objects of the invention will appear from time to time as the following specification proceeds and with reference to the accompanying drawings wherein:

Figure 1 is a partial diagrammatic view in side elevation of an automatic icemaker constructed in accordance with the invention, with certain parts thereof shown in section;

Figure 2 is a circuit diagram diagrammatically illustrating the control circuit controlling the filling of the mold and the ejection of the frozen ice cubes therefrom;

Figure 3 is a fragmentary longitudinal sectional view of a portion of the ice cube tray with certain parts removed;

Figure 4 is a transverse sectional view taken through the metering device for metering a measured volume of liquid to the ice cube molds and the reservoir for ejector fluid, supplying fluid to effect the inversion of the molds to eject ice cubes therefrom by the pressure of the water filling the metering chamber of the metering device;

Figure 5 is a partial fragmentary sectional view taken through the metering device, illustrating the switch initiating the filling of the molds and the connection from the metering device thereto to effect operation of the switch;

Figure 6 is a fragmentary sectional view taken through the ice cube tray showing the thermal element and thermostatic switch operated thereby for initiating the operation of ejecting ice cubes from the molds;

Figure 7 is a plan view of one of the flexible molds with certain parts thereof broken away.

Figure 8 is a fragmentary sectional view taken through the ice cube tray and one of the molds therein showing the mold recessed in the tray and also showing the trough for filling the mold with water; and Figure 9 is a view somewhat similar to Figure 8 with the filling trough removed, and showing the mold in an inverted position with the frozen ice cube dropping therefrom.

In the embodiment of the invention illustrated in the drawings, the icemaking apparatus includes generally a tray 10, which may be made from a metal having a relatively high heat conductivity and which may be located in heat exchange relation with respect to the evaporator or freezing chamber of a refrigerator (not shown). The tray 10 has a plurality of cavities 11 therein, opening to the top thereof and shown as being formed to a general form of a hemisphere. The cavities 11 are shown as having flexible molds 12 sealing the open ends thereof and normally conforming to the forms of said cavities and ejecting blocks of ice from said molds to one side of said tray, by inverting said molds. As herein shown, the molds 13 are inverted by fluid pressure acting on the underside thereof, supplied to the cavities 11 through passageways 13 opening through the bottoms of said cavities and having communicating cavities 15 extending along the tray 10 in opposite directions from the center thereof.

A liquid measuring device and ejector reservoir 16 is provided to measure and supply water to the molds 12, through a time delay device, such as a syphon 17, supplied with water from said measuring device through a tube 19, and having communication with a filling trough 20 through a tube 21. The liquid measuring device and ejector reservoir 16 also supplies ejector fluid through a conduit 23 having communication with a fitting 24, shown as being threaded within a central chamber 25 in the tray 10, and forming a distributing chamber for supplying ejector fluid under pressure to the passageways 15 and 13. A thermal element 27 is shown as being mounted within the fitting 24 and as having a casing 29 containing a fusible thermally expansible material. The casing 29 is positioned within the distributing chamber 25 in heat transfer relation with respect to the freezing water in the molds 12, to sense the temperature thereof and initiate an ice cube ejecting operation by operation of the thermal element 27 as the water in the molds 12 freezes, as will hereinafter more clearly appear as this specification proceeds. The casing 29 also senses the temperature of the ejector fluid and is heated thereby to reset said thermal element.

The measuring device and ejector fluid reservoir 16 comprises a container 30, herein shown as being in three sections, and including an upper section 31 having a liner 32 therein, conforming to the wall thereof when empty, and movable upon the supply of water at household pressures through an inlet port 33, to conform to an annular wall 35 depending from the top of an intermediate section 36 of the container 30. The section 31 is shown as having a flange 37 extending about its lower end portion and having an annular rib 39 of the liner 32 recessed therein, and sealing said liner to the intermediate section 36 by clamping the flange 37 into engagement with the top wall 40 of the intermediate section 36 by machine screws 41, or any other like fastening means (Figure 5).

The intermediate section 36 has an annular flange 43 extending about the lower end thereof, abutting and having interengagement with an annular flange 44 of a lower section 45 of the container 30. The underface of the intermediate section 36 has a rib 46 of a flexible liner 47 recessed therein and sealing said liner to the flange 44 of the lower section 45 by clamping the flange 43 into engagement with the flange 44, as by machine screws 49.

The interior of the liner 47 and interior of the bottom section 45 forms a reservoir 48 for ejector fluid, supplying ejector fluid under pressure to invert the molds 12 and eject ice cubes therefrom, as water is admitted through the inlet 33 to fill the liner 32 and move said liner inwardly along the wall of upper section 31 to conform to the annular wall 35 of the intermediate section 36. An outlet 50 leads from the bottom of the lower section 45 and has connection with the tube 23 connected with the chamber 25 and the passageways 15 and 13 in the tray 10.

The ejector fluid may be any neutral non-toxic fluid and preferably is a fluid which will not freeze in the environment of the refrigerator. A solution of 50% glycerine and 50% water has been found to be a suitable fluid, although various solutions may serve equally as well.

The flexible liner 47 has an enlarged diameter portion 51 conforming to the lower half of the inner wall of the intermediate section 36 when the reservoir is full, and conforming to the inner wall of the bottom section 45 when the reservoir is empty. The enlarged diameter portion 51 terminates into an inwardly extending annular shouldered portion 53, from which extends a reduced diameter liner portion 55 extending within and conforming to the liner 32 when the measuring chamber is empty and the reservoir 48 is full.

The reduced diameter portion 55 is shown as extending within a cup-like retainer 56, which may be made from metal and serves to retain the reduced diameter portion 55 from ballooning out when forcing ejector fluid through the outlet 50. The cup-like retainer 56 conforms to the form of the reduced diameter portion 55 and has an intermediate annular flanged portion 57 extending along the flange or shouldered portion 53 of the liner 47. Said retainer also has an annular wall 58 extending upwardly from the flanged portion 57 adjacent the outer margin of the annular shouldered portion 53. The annular wall 58 is shown as being coated with rubber on the outer side thereof and forming an inwardly spaced continuation of the wall of the enlarged diameter portion 51.

The flexible liner 47 may be molded from rubber, an elastomer or a like material and is partially molded within the retainer 56, the material flowing about the annular wall 58 during the molding operation, coating said wall and eliminating the necessity of cutting off the flashing or rubber that would ordinarily flow about the annular wall 58 during the molding operation. The cup-like retainer 56 besides preventing ballooning of the flexible liner 47, when forcing ejector from the reservoir, also assures that pressure will be uniformly applied to the ejector fluid.

The top wall of the reduced diameter portion 55 of the flexible bag 47 has a diaphragm plate 59 recessed therein, having a guide stem 60 welded or otherwise secured to the center thereof and slidably guided in a guide 61, extending upwardly from the bottom of the bottom section 45. The guide stem 60 and guide 61 are encircled by a return spring 63 seated at one end in a bottom wall of the bottom section 45 and its opposite end on the diaphragm plate 59.

The bottom section 45 has ports 64 leading therefrom about the guide 61, and affording communication with a volume adjusting chamber 65, formed within a threaded fitting or boss 66 depending from the bottom of section 45, and having a cap 67 threaded thereon and sealed thereto as by the marginal portion of a liner 69 for the inside of the cap 67. A spring 70 is provided to bias the liner 69 to conform to the form of the interior of the cap 67. A diaphragm plate 71 abuts the bottom of the liner 69 and is engaged by an adjusting screw 73 threaded within the cap 67 from the bottom thereof. Turning of the screw in one direction or another will thus vary the volume of the chamber 65 and the total volume of fluid contained within the ejector reservoir. As ejector fluid may leak from the system, the adjusting screw 73 may be turned an amount sufficient to compensate for leakage from the system. The adjusting screw 73 may also be used to initially calibrate the reservoir and system.

The upper section 31 of the container 30 has an inlet 75 leading thereinto, and having communication with an upwardly opening annular passageway 76, encircling the inlet port 33 into the measuring chamber. The annular passageway 76 is shown as being closed by a pressure operated diaphragm valve 77, sealed to the top of the section 31 as by a guide 79, for an armature 80 of an inlet solenoid 81. The armature 80 has a conical lower end 83 engageable with a pilot passageway 84, extending through the diaphragm valve 77 and biased into engagement therewith as by a spring 85. The valve 83 is moved out of engagement with the pilot passageway 84 upon energization of a magnet coil 86 of the solenoid, to accommodate the valve 77 to open by pressure on the under surface thereof. The valve 77 is a well known form of pressure operated solenoid controlled diaphragm valve and has a bleeder passageway 87 leading therethrough, allowing water to bleed to the top side of the valve 77 and maintain the valve closed, by the pressure of water thereon. Upon energization the magnet coil 86, the pilot port 84 will open, relieving pressure from the top side of the valve and effecting opening of the valve by pressure on the bottom side thereof.

An outlet 88 leads through the top of upper casing section 31 to an annular passageway 89 and encircling an outlet port 90 having communication with an outlet 91 leading from the top section 31. The annular passageway 89 is encircled by a pressure operated solenoid controlled pilot valve 93, like the valve 77. Opening of the valve 93 is controlled by an armature 94 of a solenoid 95, upon the energization of a magnet coil 96 of said solenoid.

The magnet coils 86 and 96 are alternately energized to effect alternate opening of the valves 77 and 93 under the control of a switch 97, diagrammatically shown in Figure 2 as being a double pole double throw switch.

The switch 97 may be a well known form of micro or limit switch so need not herein be shown or described in detail. Said switch is shown in Figure 5 as being mounted on the top of the top section 31 of the container 30 on a bracket 99. The switch 97 is operated by a link 100 secured to the annular wall 58 of the cup-like retainer 56. The switch 97 is diagrammatically shown in Figure 2 as having a movable switch arm 101 normally in the intermediate position shown when the ejector reservoir is full and the measuring chamber is empty.

The valve 77 is initially opened under the control of a thermostatic switch 103 operated by the thermal element 27, to engage a movable switch arm 104 of the switch with a stationary contact 105 of the switch as the water in the molds 12 freezes. This will complete an energizing circuit to the magnet coil 86 and effect opening of the valve 77 to initiate filling of the measuring chamber. As the measuring chamber is being filled, the water pressure acting on the flexible liner 32 will force said liner and the liner 47 downwardly against the compression spring 63, forcing ejector fluid through the outlet 50. Downward movement of the liner 47 and cup-like retainer 56 will effect operation of the switch 97 through the link 100, to complete a holding circuit from the movable switch arm 101 to a stationary contact 106, and complete a holding circuit to the magnet coil 86. This will hold said magnet coil energized as the ejector fluid flows about the casing 29 of the thermal element 27, heating said casing to effect opening of the thermostatic switch 103 as will hereinafter be more clearly described as the specification proceeds.

At the termination of the ejecting operation, the link 100, moved downwardly by downward movement of the retainer 56, will effect the movement of the movable switch arm 101 out of engagement with the stationary contact 106 into engagement with a stationary contact 107. This will deenergize the magnet coil 86 and effect closing of the valve 77 and will energize the magnet coil 96 and effect opening of the valve 93.

As the valve 93 opens, upon closing of the valve 77, the release of pressure from the measuring chamber will accommodate the spring 63 to return the liners 47 and 32 to the position shown in Figure 4. This will draw ejector fluid from the cavities 11 and the passageways 13 and 15 in the ice tray 10 and will also force water through the outlet 91 to the time delay syphon 17 for discharge into the trough 20.

The time delay syphon 17 is provided to delay the filling of the ice molds 12 until said molds have returned to their normal positions shown in Figure 8. The syphon 17, as herein shown, comprises a container 109 having an integrally formed tube 110 extending upwardly along the center thereof and beneath the bottom thereof. The tube 110 is concentric with an annular wall 111 depending from a cover 112 for the casing 109 to a position adjacent the bottom of the casing. An inlet 115 leads through the top of the cover 12 and forms an inlet fitting for the end of the tube 19. Upon movement of the liner 32 to restrict the volume of the measuring chamber and force water through the outlet 91, the casing 109 will fill with water to a level above the top of the inlet end of the tube 110 to the cover 112, before water will flow down the tube 110 to the trough 20. This will give a sufficient time delay in the filling of the trough 20 to enable the ice molds 12 to be completely retracted within the cavities 11, prior to filling thereof. As the tube 110 fills with water and flows into the distributing trough 20, a syphon will be established and the flow of water will continue until the syphon is broken by the withdrawal of water below the level of the annular wall 111.

The trough 20 may be suitably supported above the top of the tray 10 in any well known manner, and is inclined downwardly at a sufficiently sharp angle to cause the water to flow through a far end outlet 117 of the distributing trough as it flows through the nearer outlets 118 spaced along the distributor trough 20 toward the inlet end thereof. Each outlet 118 and 117 is substantially in alignment with the center of a mold 12. As shown in Figure 8, general cylindrical lips extend about the outlets 118 and the outlet 117 from an angular bottom wall 120 of the trough 20 to direct the water to fill a respective mold 12. A suitable heater (not shown) may extend along the bottom of the distributor trough to prevent freezing of the water in the outlets 117 and 118.

It should here be understood that the flow passageways forming the outlets 118 and 117 are so proportioned with respect to the slope of the distributor trough 20, that the water entering said trough at a relatively high flow rate will flow to the outlet 117 before any appreciable amount of water will flow through the outlets 118, to effect filling of all of the molds 12 to a substantially uniform depth.

The thermostatic switch 103 may be a well known form of snap acting micro switch so need not herein be shown or described in detail. Said switch is herein shown as being mounted within an end plug 121, shown as being threaded within the end of the fitting 24 into engagement with a diaphragm 123, and sealing said diaphragm to said fitting to prevent the leakage of ejector fluid into the end plug 121.

The switch arm 104 is biased to engage the stationary contact 105 and is slidably mounted on an inwardly extending leg 125 of an angle bracket 126 mounted on inner wall of the plug 121. The switch arm 104 is biased to engage the stationary contact 105 and is slidably mounted on an inwardly extending leg 125 of an angle bracket 126 mounted on inner wall of the plug 121. The switch arm 104 is engaged at one end by an actuating lever 127 rockingly mounted on the leg 125 intermediate its ends and moves said switch arm along said leg upon rocking movement of said actuating lever. The actuating lever 127 is engaged at its free end by an operating button 129 on the inner side of the diaphragm 123. Extensible movement of the diaphragm 123 toward the switch arm 104 will press the actuating lever 127 in a counterclockwise direction and move the switch arm 104 along the leg 125 toward said diaphragm. A bowed snap spring 130 is formed integrally with the switch arm 104 and cut from the center thereof and engages the leg 125 at its free end to snap the switch arm 104 to engage an open contact 128 as the switch arm 104 is moved along the leg 125 over-center with respect to the spring 130. This will reset the thermal element 27 and the control circuit. As the water in the molds 12 freezes, and the ambient temperature about the casing 29 of the thermal element 27 drops to substantially 25° F., the power member 131 of the thermal element 27 will have retractibly moved within the cylinder 133 of the thermal element by the bias of a return spring 135 of the thermal element, a distance sufficient to effect movement of the switch arm 104 into engagement with the stationary contact 105 by the bias of said switch arm and complete an energizing circuit to the magnet coil 86 for the inlet valve 77, to effect opening of said inlet valve. This in turn will force ejector fluid from the ejector reservoir 48 by the pressure of the water filling the measuring chamber, to invert the molds 12 to eject ice cubes therefrom.

The return spring 135 is shown as being seated at one end against a ring 136 within a cage 137 for the thermal element 127. The opposite end of the return spring is seated against the flange 139 of a retainer 140 suitably mounted on the power member 131 of the thermal element. The spring 135 also maintains the flange 139 of the retainer 14 in engagement with a clamping ring 141 of the thermal element and retains the thermal element to the cage 137.

The thermal element 27 is herein shown as being a well known form of wax or power type of thermal element, in which a fusible thermally expansible material is contained within the casing 29 and acts against a diaphragm (not shown) retained within said casing by the clamping ring 141, to extensibly move the power member 131 with respect to the cylinder 133 upon fusion of thermally expansible material contained within the casing 29. The thermal element operates on principles similar to those shown and described in the Vernet Patent No. 2,368,181 dated January 30, 1945, and no part of the present invention so not herein shown or described further.

Referring now to Figs. 7, 8 and 9 and the flexible molds 12, said molds may be made from rubber or a like stretchable material and have an interior wall 145 in the general form of a hemisphere when the molds are in their normal positions within the hemispherical cavities 11 of the ice tray 10. As shown in Figs. 7 and 10, each flexible mold 12 has a thickened outer rim 144, engaging at its outer surface an outer annular wall 146 of the cavity 11, and sealed thereto as by a wire or like clamping device 147. When the mold is in its normal position, it extends upwardly over the top of the wall 146 and downwardly within the cavity 11, as shown in Fig. 8. The flexible mold 12 also has two spaced outer ribs 150 and an intermediate rib 151 disposed therebetween. The ribs 150 and 151 extend perpendicularly to the rim 144 along the outer wall of the mold and terminate adjacent the base of the mold. The wall of the flexible mold 12 between the extending ribs 150 and 151 is shown as being thinner than the wall outside of the ribs 150, as indicated by the reference character 152 applied to the thinner wall portion between said ribs. The ribs 150 and 151 serve to stiffen one side of the mold, which is shown in Figures 8 and 9 as being the left hand side of the mold, or the side of the mold beyond which it is desired to discharge the ice cube.

As fluid under pressure is admitted to the cavities 11 through the passageways 13, the more flexible sides of the molds 12 will first flex, while the opposite sides of the molds will be held relatively rigid by the ribs 150. This will cause the ice cubes to peel from the flexible sides of the molds, as the molds are inverted and will tend to tilt the ice cubes toward the stiffer sides of the molds, to which sides the ice cubes will adhere. As the mold 12 is inverted to the position shown in Fig. 9, the ice cubes will still adhere to the molds and will be in a position to drop to their container. The continued application of pressure within the cavities 11 will flex the thin wall portion 152 between the two ribs 150, stretching the thin wall portion more than the rest of the mold and causing the center rib to move outwardly and thereby release the ice cubes to drop into their container (not shown).

It should be here understood that in order to flex the thin wall portion of the mold 12 between the ribs 150, that the capacity of the ejector reservoir 48 must be substantially greater than the capacities of the cavities 11 and molds 12 when in inverted position shown in Fig. 9. A capacity of the ejector reservoir 48 of substantially three times the capacity of the cavities 11 and outer wall of the molds 12 when in their inverted positions has been found to be suitable, although it should readily be understood that the capacity of the ejector reservoir may be varied and that all that is necessary is that the ejector reservoir have a greater capacity than the capacity of the cavities 11 and outer wall of the molds 12 when said molds are in their inverted positions.

In operation of the icemaker, assuming the molds 12 are filled with water and are in the normal retracted positions shown in Figure 8 and the ejector reservoir is filled with ejector fluid as shown in Figure 4, when the ambient temperature around the casing 29 of the thermal element 27 drops to substantially to 25° F., indicating that the water in the molds 12 is frozen, the power member 131 will have moved inwardly along the cylinder 133 a distance sufficient to accommodate the switch arm 104 to move to its biased position into engagement with the stationary contact 105 of the switch and complete an energizing circuit to the magnet coil 86 to effect opening of the valve 77. Water at household pressure will then flow within the metering chamber and move the liner 32 along said chamber in a direction to increase the volume thereof, and at the same time move the liner 47 against the spring 63 in a direction to force ejector fluid from the ejector reservoir 48 into the cavities 11. The ejector fluid being stored at room temperature and flowing around the casing 29 of the thermal element 27 during the ejecting operation will heat said thermal element and effect extensible movement of the power member 131 to effect the disengagement of the switch arm 104 from the stationary contact 105, and effect opening of the switch 103. As, however, the liner 47 is moved in direction to eject fluid from the reservoir, the link 100 will operate the switch 97 and move the switch arm 101 into engagement with the stationary contact 106 and establish a holding circuit to hold the magnet coil 86 energized until said liner 47 has reached the end of its ejecting stroke. At this time, the cavities 11 and outer walls of the molds 12 will be filled with ejector fluid, inverting said molds and flexing the thin wall portions 152 between the ribs 150 to loosen the ice cubes therefrom to drop to their storage container.

As the thin wall portions 152 between the ribs 150 are stretched to an extent sufficient to cause the ice cubes to drop from the molds 12, the liner 47 will be at the end of its ejector stroke. The link 100 will then operate the switch 97 to disengage the movable contact 101 from the stationary contact 106 and deenergize the inlet electromagnet 86. This will effect closing of the valve 77. The movable contact 101 will then be moved into engagement with the stationary contact 107 to energize the magnet coil 96 and effect opening of the outlet valve 93.

The spring 63 will then move the flexible liners 47 and 32 toward the position shown in Figure 4, and force a measured volume of water through the outlet 91 at the end of the return or measuring stroke of the flexible liner 32. Return movement of the flexible liner 47 will withdraw ejector fluid from the cavities 11 and withdraw the flexible molds 12 within the cavities 11 into the position shown in Figure 8.

As water is forced through the outlet 91, it will flow to the syphon 17, where the water will be stored until the level of water in the syphon reaches the level of the top of the tube 110. The water will then flow through the tube 110 and inlet 21 of the trough 20 downwardly along said trough, through the outlet 17 and outlet 18 to fill the molds 12 with a measured volume of water.

It will be understood that various modifications and variations in the present invention may be effected without departing from the spirit and scope of the novel concepts thereof.

We claim as our invention:

1. In an automatic icemaker, a tray, an invertible mold secured to said tray and normally in a concave water receiving condition, metering means for filling said mold with a measured volume of water, and fluid pressure means operated by the pressure of filling said metering means for supplying fluid pressure to the underside of said mold, to invert said mold into a convex condition and eject an ice cube therefrom.

2. In an automatic icemaker, a tray, a flexible invertible mold sealed to said tray, metering means for metering a measured volume of water to said mold, fluid pressure means operated by the pressure of filling said metering means for supplying ejector fluid under pressure to invert said mold, a thermal element in heat transfer relation with respect to said mold for initiating a filling cycle of said metering means and an ejecting cycle of ice from said mold, said thermal element being located in heat transfer relation with respect to the ejector fluid supplying pressure to invert said mold, and the heat of the ejector fluid resetting said thermal element to initiate a next succeeding ejecting operation upon the freezing of water in said mold.

3. In an automatic icemaker, a tray having a cavity therein, a fluid passageway extending along said tray and opening to said cavity through the bottom thereof, an invertible flexible mold in said cavity and sealed thereto, a measuring device for metering water to said mold, means for filling said measuring device with water, a reservoir for ejector fluid in association with said measuring device and supplying ejector fluid under pressure to said cavity to invert said mold, said reservoir having a movable wall portion movable to decrease the volume of said reservoir and force ejector fluid therefrom by the pressure of fluid filling said measuring device.

4. In an automatic icemaker, a tray having a cavity therein, a fluid passageway extending along said tray and opening to said cavity through the bottom thereof, an invertible flexible mold in said cavity and sealed thereto, a measuring device for metering water to said mold, means for filling said measuring device with water, a reservoir for ejector fluid in association with said measuring device and supplying ejector fluid under pressure to said cavity to invert said mold, said reservoir having a movable wall portion movable to decrease the volume of said reservoir and force ejector fluid therefrom by the pressure of fluid filling said measuring device, and a thermal element in said fluid passageway, sensing the temperature of the frozen water, and effecting the operation of said means for filling said measuring device, to effect the supply of pressure to move said movable portion of said reservoir to decrease the volume thereof and force ejector fluid through said passageway to invert said mold and release ice therefrom.

5. In an automatic icemaker, a tray having a plurality of cavities therein, a fluid passageway extending along said tray and opening to said cavities, a flexible mold in each cavity and sealed thereto, a measuring device for metering water to said molds, means for filling said measuring device with water under pressure, a reservoir for ejector fluid in association with said measuring device and having a portion movable to decrease the volume of said reservoir and supply ejector fluid to said passageway to invert said molds, said movable portion of said reservoir being moved to force ejector fluid therefrom by the pressure of water filling said measuring device and having a greater capacity than the capacity of said cavities and the space between said molds when in inverted ice cube ejecting positions, to effect stretching of said molds and the release of ice cubes therefrom.

6. In an automatic icemaker, a tray having a plurality of cavities therein, a fluid passageway extending along said tray and opening to said cavities, an invertible flexible mold in each cavity and sealed thereto and inverted to eject frozen ice therefrom by the pressure of fluid entering said cavities through said passageway, a measuring device for metering water to said molds, a reservoir for ejector fluid having fluid connection with said passageway and supplying fluid to said cavities to invert said molds, said reservoir having a movable portion movable to decrease the volume of said reservoir and force ejector fluid therefrom by the pressure of water filling said metering device, means moving said movable portion in a direction to increase the volume of said reservoir and withdraw ejector fluid from said cavities and force a measured volume of water from said measuring device to fill said molds, and time delay means connected between said measuring device and said molds and providing a sufficient time delay to delay the filling of said molds until completely retracted within said cavities.

7. In an automatic icemaker, a tray having a plurality of cavities therein, a fluid passageway extending along said tray and opening to said cavities, an invertible flexible mold in each cavity and sealed thereto and inverted to eject frozen ice therefrom by the pressure of fluid entering said cavities through said passageway, a measuring device for metering water to said molds, a reservoir for ejector fluid having fluid connection with said passageway and supplying fluid to said cavities to invert said molds, said reservoir having a movable portion movable to decrease the volume of said reservoir and force ejector fluid therefrom by the pressure of water filling said metering device, means moving said movable portion in a direction to increase the volume of said reservoir and withdraw ejector fluid from said cavities and force a measured volume of water from said measuring device to fill said molds, time delay means connected between said measuring device and said molds and providing a sufficient time delay to delay the filling of said molds until completely retracted within said cavities, a thermal element in said passageway in heat transfer relation with respect to the water in said molds and initiating a filling operation of said metering device upon the freezing of water in said molds and the supply of ejector fluid to said cavities to invert said molds, said ejector reservoir being subject to an ambient temperature substantially higher than that of the frozen ice cubes, and the ejector fluid flowing over said thermal element resetting said thermal element in position to effect a next succeeding ejecting operation upon the freezing of water in said molds.

8. In an automatic icemaker, a tray having a plurality of cavities therein, a fluid passageway extending along said tray and opening to said cavities, a flexible mold in each cavity and sealed thereto, a fluid metering device supplying fluid to fill said molds including a chamber having a movable portion, means for admitting water to said chamber to effect movement of said movable portion to increase the volume thereof, other means for releasing water from said chamber to fill said molds, a reservoir in association with said metering device and having a movable portion moved by movement of said movable portion of said chamber in a direction to increase the volume thereof, to decrease the volume of said reservoir and force ejector fluid therefrom, said reservoir having fluid communication with said passageway extending along said tray and supplying ejector fluid to invert said molds and stretch said molds to eject ice cubes therefrom, said reservoir having a capacity substantially greater than the capacity of said cavities and said molds when in their ejected positions to provide sufficient fluid to stretch said molds and release ice therefrom.

9. In an automatic icemaker, a tray having a plurality of cavities therein, a fluid passageway extending along said tray and opening to said cavities, a flexible mold in each cavity and sealed thereto, a fluid metering device supplying fluid to fill said molds including a chamber having a movable portion, means for admitting water to said chamber to effect movement of said movable portion to increase the volume thereof, other means for releasing water from said chamber to fill said molds, a reservoir in association with said metering device and having a movable portion moved by movement of said movable portion of said chamber in a direction to increase the volume thereof, to decrease the volume of said reservoir and force ejector fluid therefrom, said reservoir having fluid communication with said passageway extending along said tray and supplying ejector fluid to invert said molds and stretch said molds to eject ice cubes therefrom, said reservoir having a capacity substantially greater than the capacity of said cavities and said molds when in their ejected positions, to provide sufficient fluid to stretch said molds and release ice therefrom, and spring means for moving said movable portion of said reservoir in a direction to increase the volume thereof and draw ejector fluid from said cavities and return said molds within said cavities and for moving said movable portion of said chamber in a direction to force water therefrom upon operation of said means to release a measured volume of water from said chamber for supply to said cavities.

10. In an automatic icemaker, a tray having a plurality of cavities therein, a fluid passageway extending along said tray and opening to said cavities, a flexible mold in each cavity and sealed thereto, a fluid metering device supplying fluid to fill said molds including a chamber having a movable portion, means for admitting water to said chamber to effect movement of said movable portion to increase the volume thereof, other means for releasing water from said chamber to fill said molds, a reservoir in association with said metering device and having a movable portion moved by movement of said movable portion of said chamber in a direction to increase the volume thereof, to decrease the volume of said reservoir and force ejector fluid therefrom, said reservoir having fluid communication with said passageway extending along said tray and supplying ejector fluid to invert said molds and stretch said molds to eject ice cubes therefrom, said reservoir having a capacity substantially greater than the capacity of said cavities and said molds when in their ejected positions to provide sufficient fluid to stretch said molds and release ice therefrom, spring means for moving said movable portion of said reservoir in a direction to increase the volume thereof and draw ejector fluid from said cavities and return said molds within said cavities and for moving said movable portion of said chamber in a direction to force water therefrom upon operation of said means to release a measured volume of water from said chamber for supply to said cavities, and a time delay syphon between said metering device and said cavities, delaying the time of filling said molds until the withdrawal of sufficient ejector fluid from said cavities to return said molds within said cavities.

11. In an automatic icemaker, a tray having a plurality of cavities therein, a fluid passageway extending along said tray and opening to said cavities, an invertible flexible mold in each cavity and sealed thereto, a fluid metering device supplying water to fill said molds including a chamber having a movable portion, valve means for admitting water under pressure to said chamber to effect movement of said movable portion in a direction to increase the volume of said chamber, other valve means for releasing water from said chamber, a reservoir in association with said metering device and having a movable portion engaged by the movable portion of said chamber and moved thereby by the pressure of fluid filling said chamber to decrease the volume of said reservoir and force ejector fluid therefrom, said reservoir supplying ejector fluid to said cavities to invert said molds and release ice cubes therefrom, and a thermal element in heat transfer relation with respect to said tray, operable to effect opening of said first mentioned valve means and filling of said metering device upon the freezing of water in said molds and to effect the movement of said movable portion of said reservoir by the pressure of filling said metering device, to force ejector fluid into said cavities to invert said molds, said reservoir being in a region of higher ambient temperature than the ambient temperature around said molds, and the ejector fluid serving to heat said thermal element to reset said thermal element in position to effect a next succeeding filling and ejecting operation as water again freezes in said molds.

12. In an automatic icemaker, a tray having a plurality of cavities therein, a fluid passageway extending along said tray and opening to said cavities, an invertible flexible mold in each cavity and sealed thereto, a fluid metering device supplying water to fill said molds including a chamber having a movable portion, valve means for admitting water under pressure to said chamber to effect movement of said movable portion in a direction to increase the volume of said chamber, other valve means operable alternately of said first mentioned valve means to release water from said chamber, a reservoir in association with said metering device and having a movable portion engaged by the movable portion of said chamber and moved thereby by the pressure of filling said chamber to decrease the volume of said reservoir and force ejector fluid therefrom, said reservoir supplying ejector fluid to said cavities to invert said molds and release ice cubes therefrom, and a thermal element in heat transfer relation with respect to said tray, operable to effect opening of said first mentioned valve means and filling of said metering device upon the freezing of water in said molds and to effect the movement of said movable portion of said reservoir by the pressure of filling said metering device, to force ejector fluid into said cavities to invert said molds, said reservoir being in a region of higher ambient temperature than the ambient temperature around said molds, and the ejector fluid heating said thermal element to reset said thermal element in position to effect a next succeeding filling and ejecting operation as water again freezes in said molds, means operated by the movable portion of said reservoir to the end of its ejector stroke to effect opening of said second mentioned valve means, to effect the supply of water to said molds, and time delay means connected between said second mentioned valve means of said metering device and said molds and delaying the filling of said molds upon opening of said second mentioned valve means until the return of said molds within said cavities.

13. In an automatic icemaker, a tray having a cavity therein having an outer wall extending thereabout, a flexible mold in said cavity sealed to said cavity about said outer wall, means for filling said mold, fluid pressure means for inverting said mold, said mold being stiffer on one side thereof than the other to effect the initial flexing of the more flexible side of the mold by the pressure of ejector fluid entering said cavity to peel the ice cube from the more flexible side of said mold, the ice cube adhering to the stiffer side of said mold and moved to one side of the tray thereby, and the stiffer side of said mold stretching upon the complete inverting of said mold and releasing the ice cube therefrom.

14. In an automatic icemaker, a tray having a cavity therein, an invertible flexible mold in said cavity, sealed thereto at its margin, means for filling said mold, fluid pressure means supplying fluid under pressure to invert said mold to carry an ice cube to one side of said mold and eject the ice cube therefrom, said mold having spaced ribs extending along one side thereof and the wall of said mold within said ribs being of a thinner cross section than the balance of the wall of said mold, said ribs stiffening the side of said mold along which they extend and accommodating initial flexing of the side of said mold opposite said ribs to peel the ice cube therefrom upon the admission of ejector fluid under pressure to said cavity, and the wall section of said mold within said ribs stretching to a greater extent than the balance of said mold upon the complete inversion of said mold and releasing the ice cube therefrom.

15. In an automatic icemaker, a tray having a cavity therein of a generally hemispherical form, an invertible flexible mold extending within said cavity and generally conforming to the form thereof, relatively closely spaced ribs extending along the outer wall of said mold into engagement with the wall of said cavity and stiffening the side of said mold from which it is desired to eject the ice cubes and accommodating initial flexing of the side of said mold opposite said ribs to peel the ice cube therefrom upon the admission of fluid under pressure to said cavity, and accommodating the cube to adhere to the stiffer side of said mold, and the wall of said mold within said ribs being of a thinner cross section than the cross section of balance of the wall of said mold and stretching to a greater extent than the balance of said mold upon inversion of said mold to release an ice cube from said mold by the stretching of said wall section within said ribs.

16. An invertible flexible mold for ice cubes and the like of a type adapted to be supported in heat transfer relation with respect to an ice cube tray and ejecting the cube from the tray by the inversion of the mold by the pressure of fluid acting on the outer side thereof, comprising a flexible stretchable mold having an inner wall defining a cavity and having means stiffening said wall along one side thereof, to effect initial flexing of said wall along the opposite side thereof upon the initial inversion of said mold to peel an ice cube from the more resilient side of the mold and retain the ice cube to the stiffer side of the mold, the wall of the mold between the stiffening means being of a thinner cross section than the major portion of the wall thereof, and stretching upon complete inversion of the mold to effect the release of an ice cube therefrom.

17. A flexible mold for ice cubes and the like of a type adapted to be supported in heat transfer relation with respect to an ice cube tray and adapted to release the cubes by the inverting of said mold by the pressure of fluid acting on the underside thereof, comprising a yieldable mold having an inner wall defining a cavity and having an outer wall having spaced ribs extending along the outer race thereof for a portion of the circumference thereof from the open end thereof and stiffening one side of the mold to effect flexing of the opposite side of the mold upon the initial inverting of the mold and thereby causing the ice cube to peel from the more flexible side of the mold and adhere to the stiffer side thereof, and the wall of the mold in the space between said ribs being of a thinner cross section than the balance of the wall of the mold and stretching upon the complete inversion of said mold to effect the release of ice cubes therefrom.

18. A flexible mold for ice cubes and the like of a type adapted to be supported in heat transfer relation with respect to an ice cube tray and adapted to release the cubes by the inverting of said mold by the pressure of fluid acting on the underside thereof, comprising a yieldable mold having a cavity in the general form of a hemisphere and having at least two spaced ribs extending along the outer wall of said mold from a position adjacent the rim thereof to a position adjacent the bottom thereof, said ribs stiffening one side of said mold to prevent flexing of the stiffer side of the mold upon the initial inverting of the mold and causing the ice cube to peel from the more flexible side of the mold and to adhere to the stiffer side of the mold, and move herewith to one side of the mold upon the inverting of said mold.

19. A flexible mold for ice cubes and the like of a type adapted to be supported in heat transfer relation with respect to an ice cube tray and adapted to release the cubes by the inverting of said mold by the pressure of fluid acting on the underside thereof, comprising a yieldable mold having a cavity in the general form of a hemisphere and having at least two spaced ribs extending along the outer wall of said mold from a position adjacent the rim thereof to a position adjacent the bottom thereof, said ribs stiffening one side of said mold to prevent flexing of the stiffer side of the mold upon the initial inverting of the mold and causing the ice cube to peel from the more flexible side of the mold and to adhere to the stiffer side of the mold, and move herewith to one side of the mold upon the inverting of said mold, and the wall section of said mold within said ribs being thinner than the wall section of said mold outside of said ribs, and stretching upon the complete inversion of said mold to release the ice cube therefrom.

20. In an automatic icemaker, a tray having a plurality of cavities therein, a flexible mold in each cavity and sealed thereto, a measuring device for metering water to said mold, means for filling said measuring device with a given volume of water under pressure, a reservoir for ejector fluid in association with said measuring device and containing a substantially greater volume of ejector fluid than the volume of said measuring device, said measuring device having a portion movable to decrease the volume of said reservoir as the volume of said measuring device is increased by the filling of said measuring device with water, to supply ejector fluid to said cavities to invert said molds, the volume of said reservoir being greater than the volume of said cavities and the space between said molds when said molds are in inverted ice cube ejecting positions, whereby the filling of said measuring device with water effects the pumping of a substantially greater volume of ejector fluid to said cavities to invert and effect stretching of said molds and the release of ice cubes therefrom.

References Cited in the file of this patent

UNITED STATES PATENTS

| | | |
|---|---|---|
| 2,026,227 | Foraker | Dec. 31, 1935 |
| 2,717,495 | Andersson | Sept. 13, 1955 |
| 2,770,102 | Roedter | Nov. 13, 1956 |
| 2,809,500 | Frei | Oct. 15, 1957 |